Jan. 22, 1963

C. H. WIKLUND 3,074,314

SLIDE CHANGING DEVICE

Filed Dec. 9, 1957

INVENTOR.
CARL H. WIKLUND
BY
Norman N. Holland
ATTORNEY

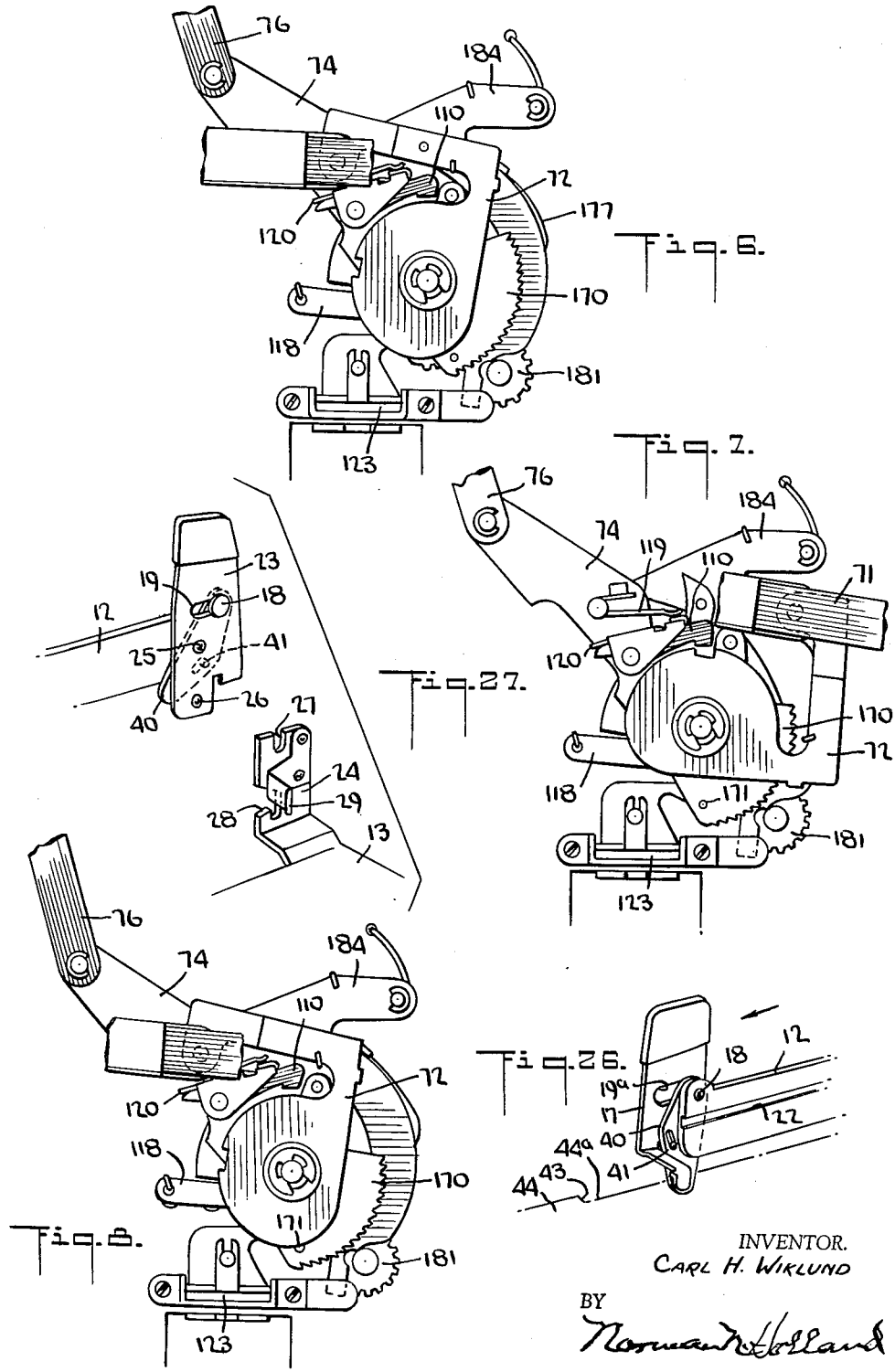

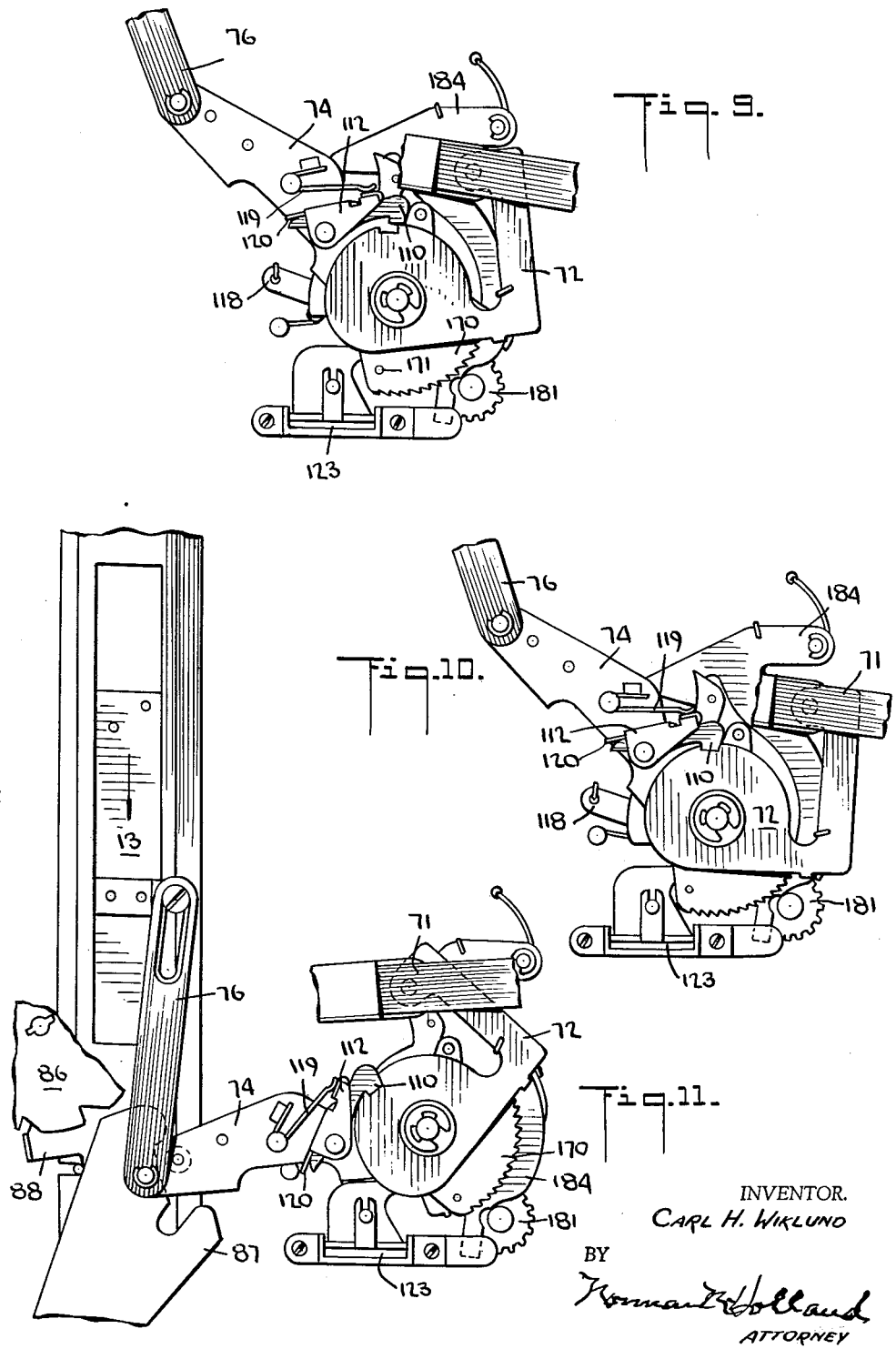

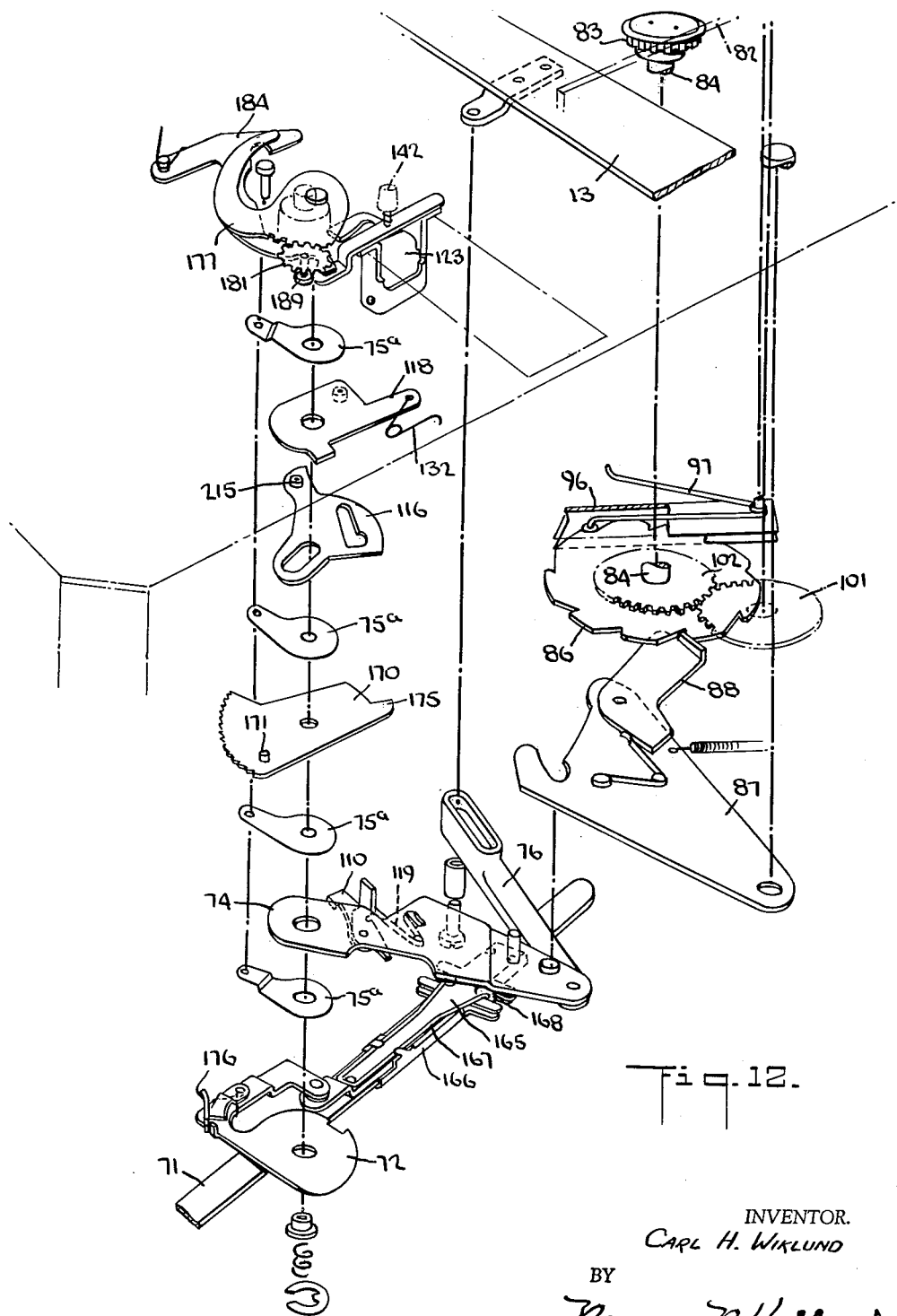

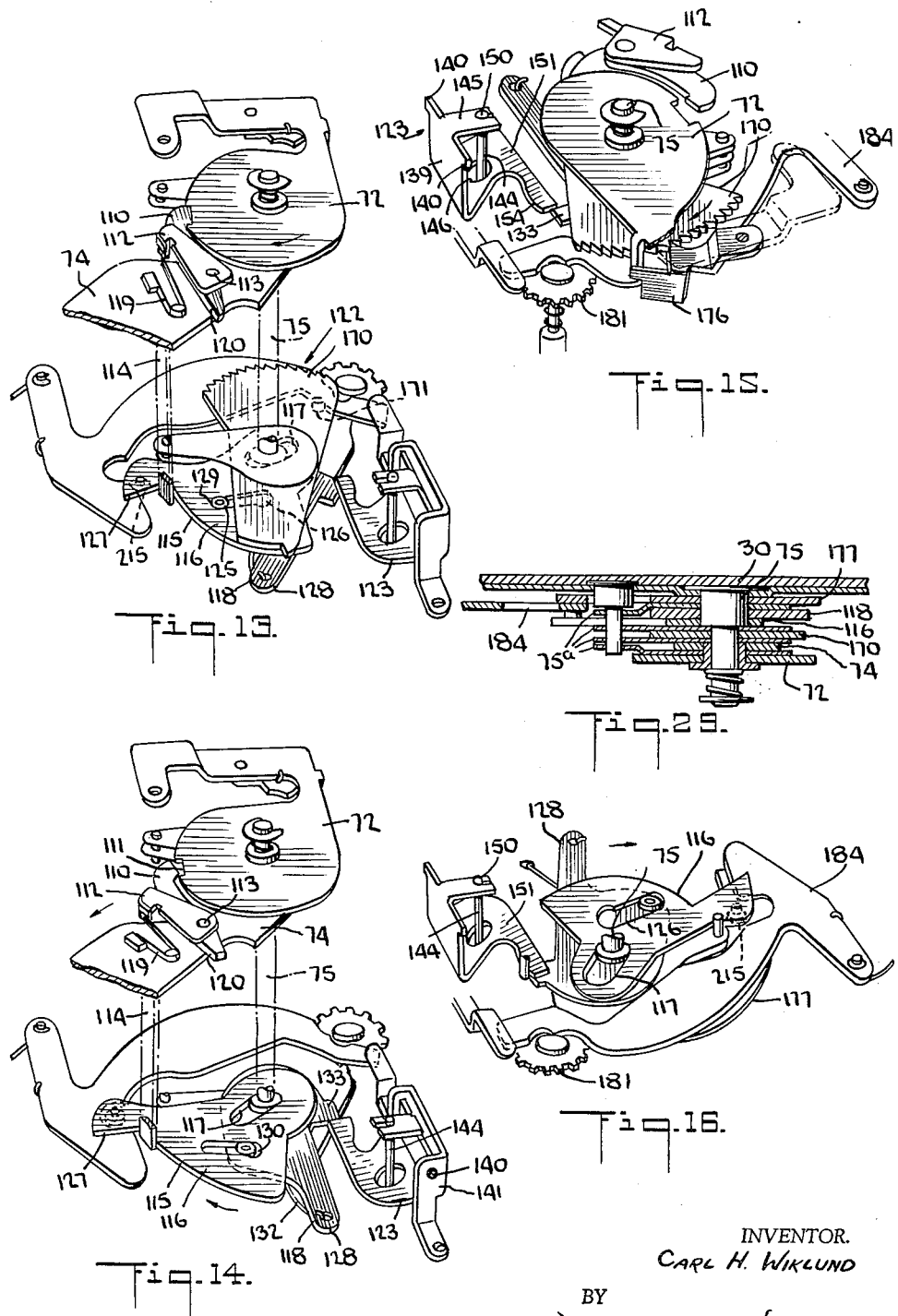

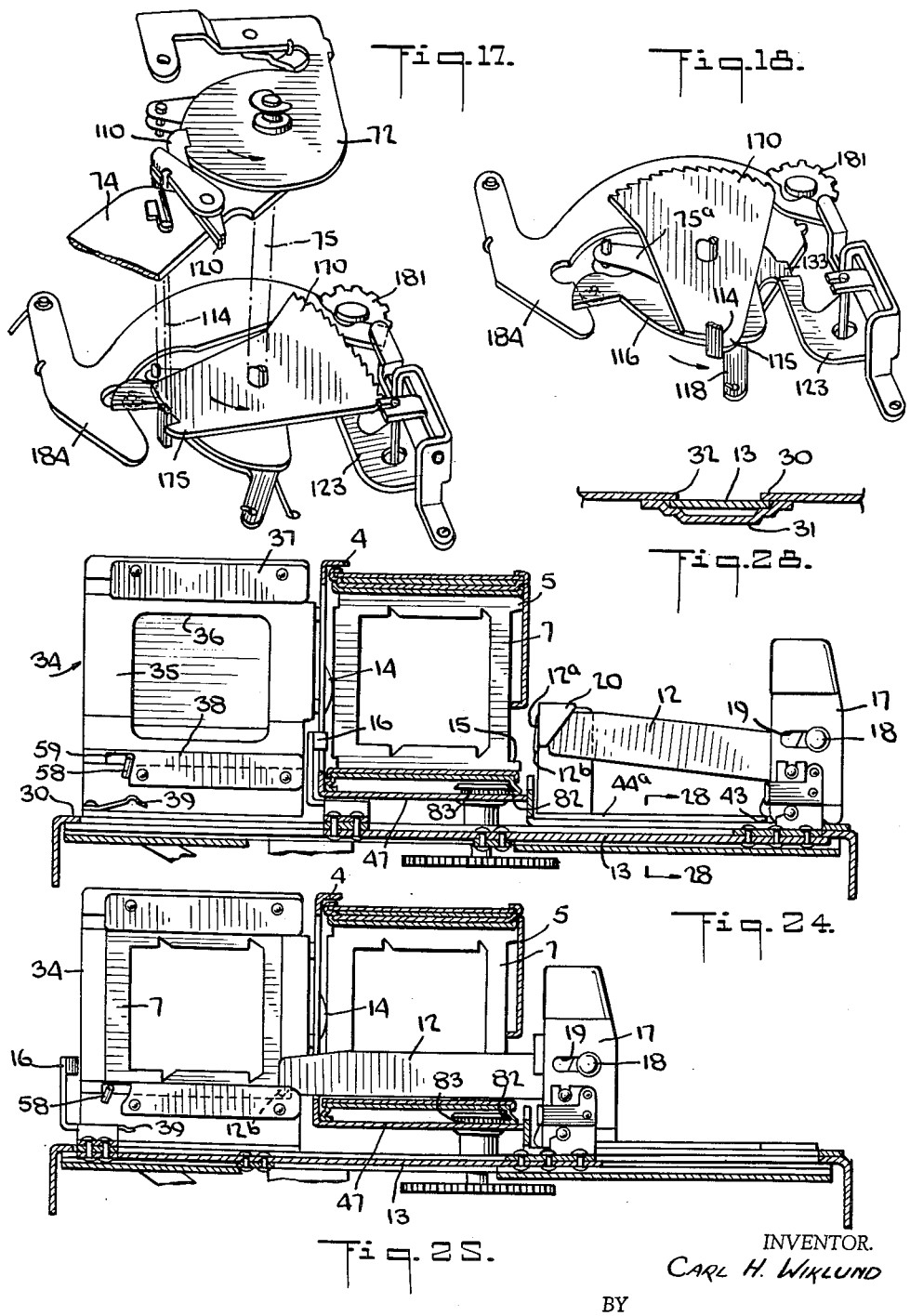

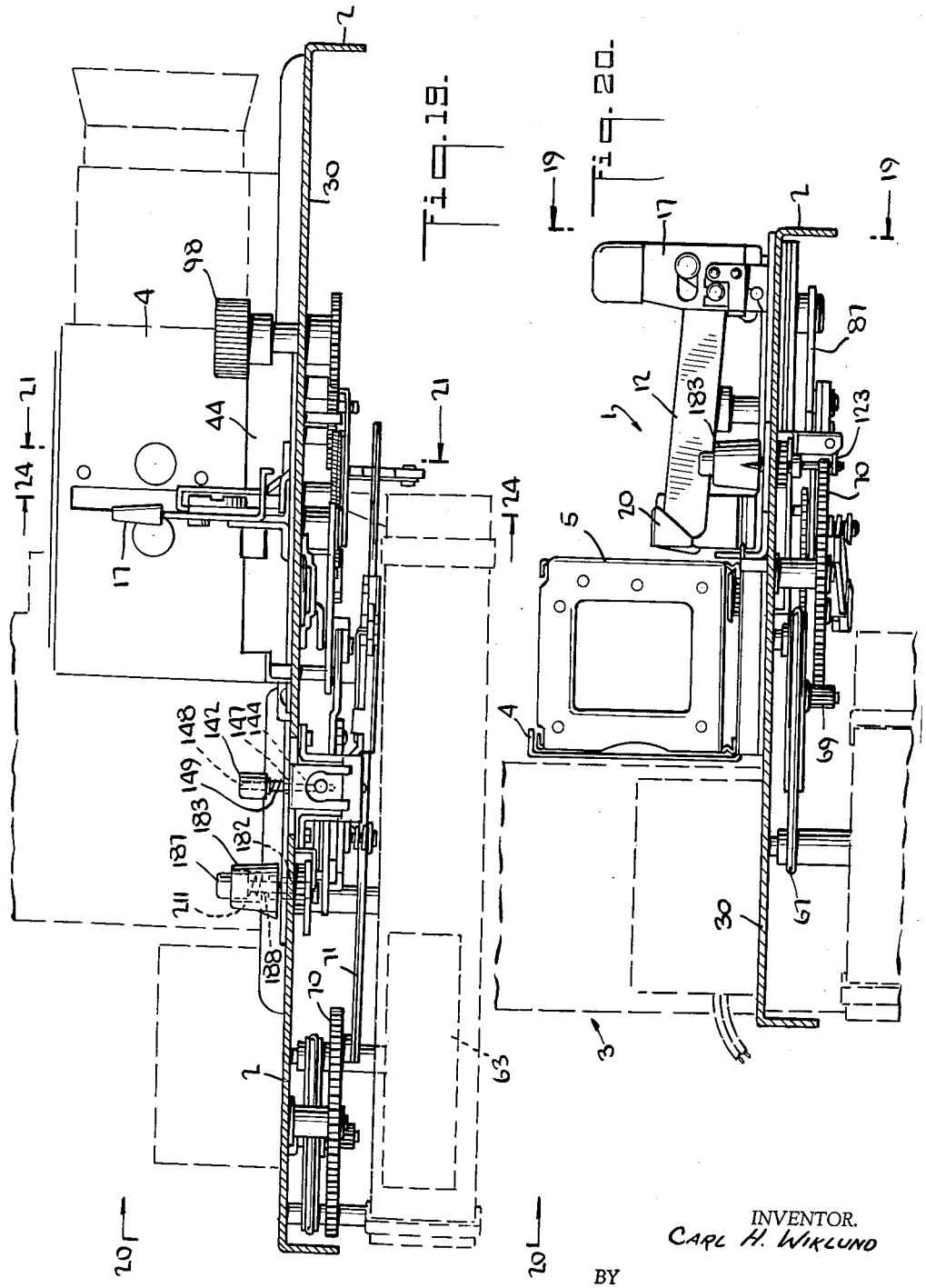

Jan. 22, 1963 — C. H. WIKLUND — 3,074,314
SLIDE CHANGING DEVICE
Filed Dec. 9, 1957 — 11 Sheets-Sheet 10
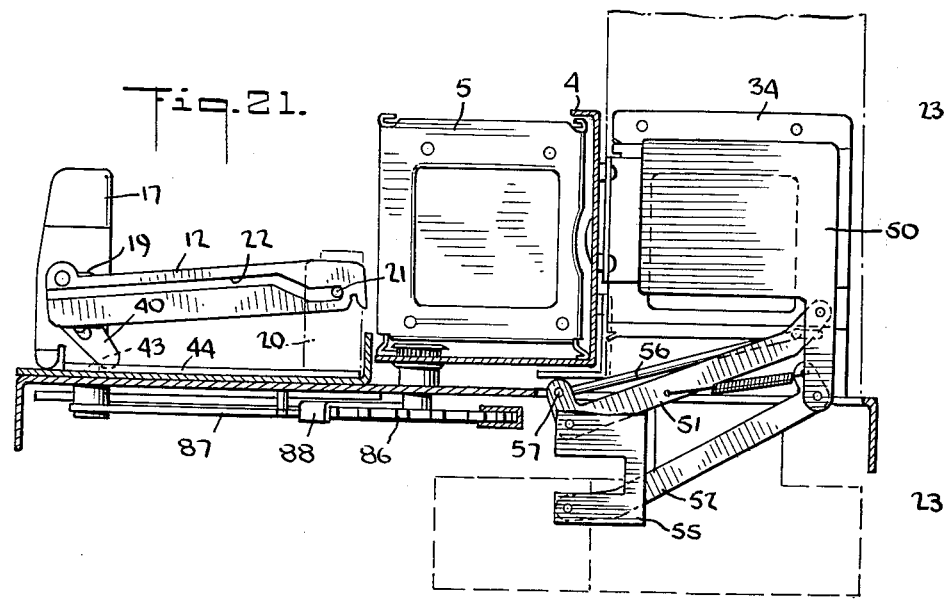
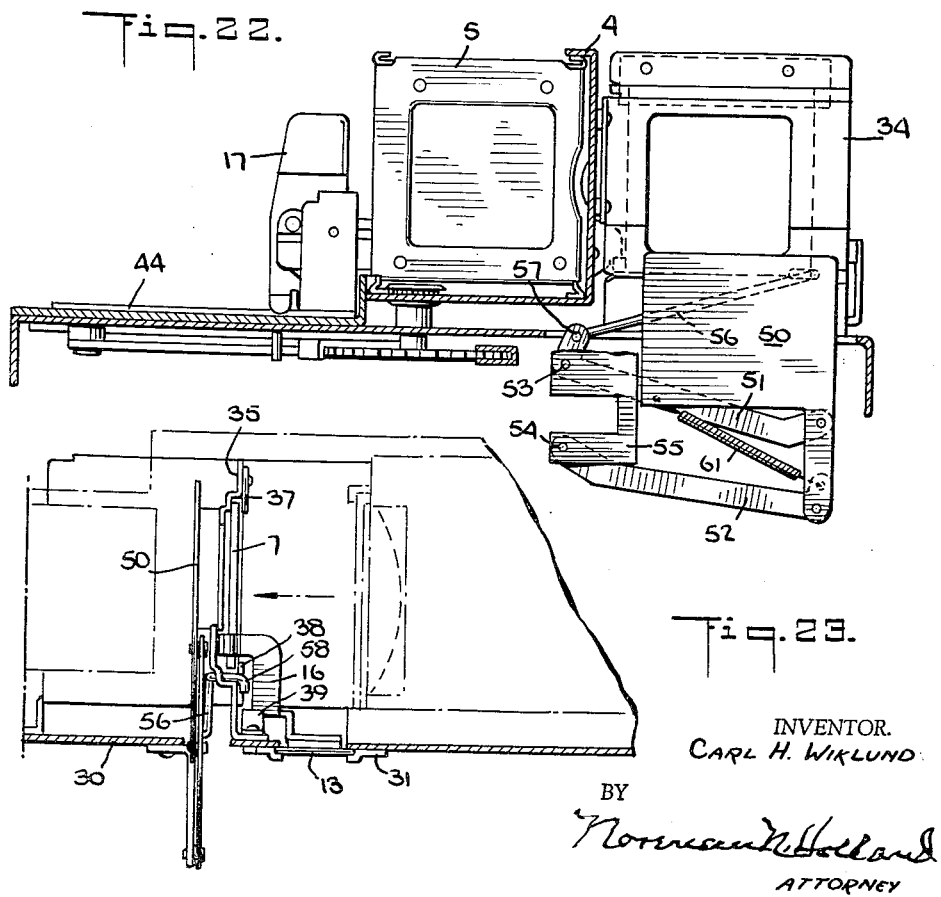
INVENTOR.
CARL H. WIKLUND
BY
Norman N. Holland
ATTORNEY Jan. 22, 1963  C. H. WIKLUND  3,074,314
SLIDE CHANGING DEVICE
Filed Dec. 9, 1957  11 Sheets-Sheet 11
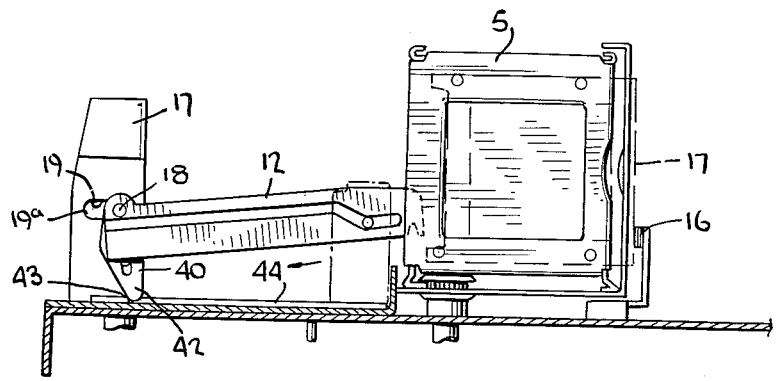
Fig. 31.
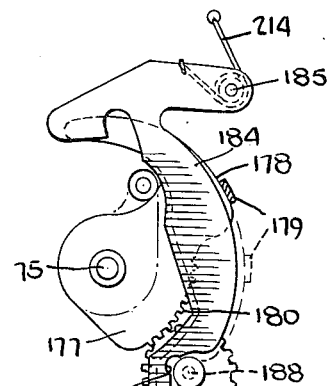
Fig. 30.
Fig. 32.
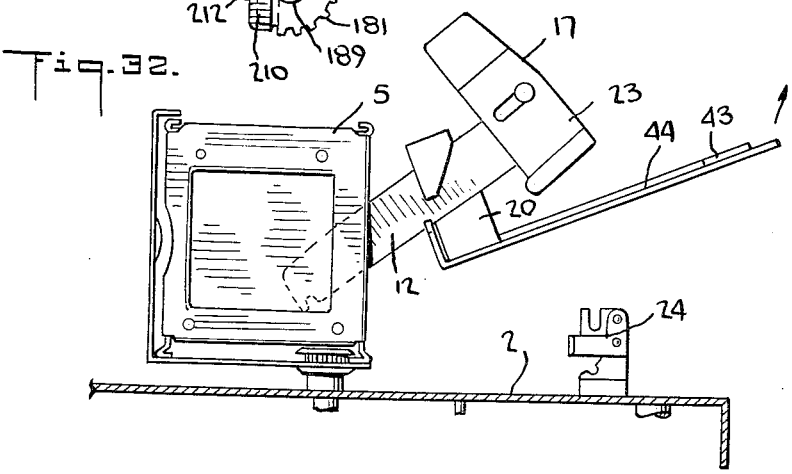
INVENTOR.
CARL H. WIKLUND
BY
Norman N. Holland
ATTORNEY

United States Patent Office 3,074,314
Patented Jan. 22, 1963

3,074,314
SLIDE CHANGING DEVICE
Carl H. Wiklund, New Rochelle, N.Y., assignor to Airequipt Manufacturing Co., Inc., New Rochelle, N.Y., a corporation of New York
Filed Dec. 9, 1957, Ser. No. 701,553
3 Claims. (Cl. 88—28)

The present invention relates to a slide changing device for transparent slides and more particularly to an improved automatic slide handling means adapted to be incorporated in a slide projector.

The constantly increasing use of transparent or colored slides in amateur photography has increased the need for an improved device for viewing the slides and particularly for a viewing device including an improved automatic means for holding and changing a set of slides. Various types of slide projectors or viewers are now being marketed; however, the automatic variety of these devices are relatively large, complex, and expensive. The present invention provides a magazine-type slide changer which is adapted for fully automatic operation and which at the same time is a relatively simple, rugged, and compact slide handling means for automatically changing a series of slides mounted in a slide magazine. The slide changing device of the present invention is particularly adapted for manufacture in a compact form so that it may be conveniently fitted into a relatively small and attractive projector casing.

Accordingly, an object of the present invention is to provide an improved slide changing device.

Another object of the present invention is to provide a fully automatic slide changer characterized by its compact design.

Another object of the present invention is to provide an improved fully automatic and relatively simple slide changing mechanism for a slide projector.

Another object of the present invention is to provide a versatile slide changing mechanism adapted for optional use as a hand-operated, a semiautomatic, or a fully automatic changer.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIGS. 5–11 are enlarged detailed views of the slide changer timing mechanism showing different stages of a slide changing cycle;

FIG. 12 is an exploded perspective view of the timer and the magazine indexing means;

FIGS. 13–18 are perspective views partially cut away of the timing mechanism in different stages of a timing cycle;

FIG. 19 is a vertical sectional view taken along line 19—19 of FIG. 20;

FIG. 20 is a sectional view taken along line 20—20 of FIG. 19;

FIG. 21 is a vertical sectional view taken along line 21—21 of FIG. 19;

FIG. 22 is a vertical sectional view corresponding to FIG. 21 with a slide frame in viewing position;

FIG. 23 is a sectional view taken along line 23—23 of FIG. 21;

FIG. 24 is a vertical sectional view taken along line 24—24 of FIG. 19;

FIG. 25 is a vertical sectional view corresponding to FIG. 24 with a slide frame in the viewing position;

FIG. 26 is an enlarged detailed perspective view of the slide injection lever in its attached position;

FIG. 27 is an enlarged perspective view of the slide injection lever in its detached position;

FIG. 28 is a sectional view taken along line 28—28 of FIG. 24;

FIG. 29 is a vertical sectional view of the timer mechanism;

FIG. 30 is a detailed bottom plan view of the timer;

FIG. 31 is a fragmentary sectional view showing the slide injection lever intermediate its extreme operating positions; and FIG. 32 is a fragmentary elevational view showing the slide injection lever and the guide plate in a detached condition.

Figure 1:
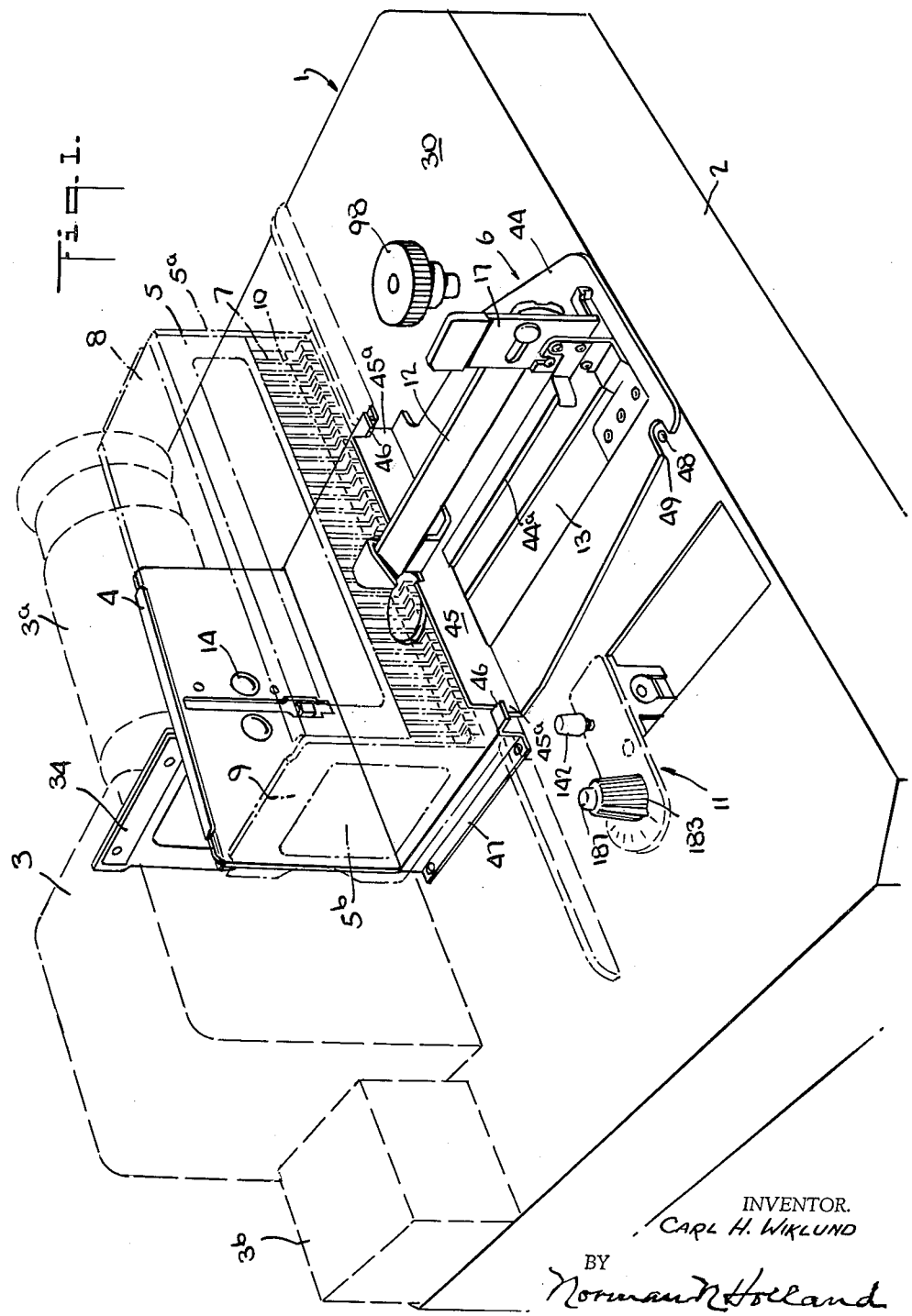
FIG. 1 is a perspective view of the slide changer according to the present invention.

The improved slide changer of the present invention will be first generally described with reference to FIG. 1 and thereafter the important components will be described under suitable headings. The changer 1 includes a base 2 suitable for the addition of a conventional lamp and reflector unit 3, lens unit 3a, and motor 3b. The lamp and reflector unit 3, the lens unit 3a, and the motor 3b form no part of the present invention and are shown in FIG. 1 to illustrate the relation of the slide changer to a projector unit.

Slide changer 1 is adapted to slidably mount a slide holding magaizne 5 adjacent to the projector units 3 and a slide injection mechanism indicated generally at 6 is adapted to sequentially move a plurality of slide frames 7 from the magazine 5 to a viewing position in conjunction with the lamp and reflector unit 3 and the lens unit 3a. The magazine 5 comprises longitudinal walls 8 and end walls 9 having a plurality of vertical partitions 10 mounted therein and adapted to store a plurality of slide frames 7 therebetween. The magazine 5 per se comprises no part of the present invention and may be a magazine such as is disclosed in prior Patent No. 2,711,602, which issued on June 28, 1955.

A timing mechanism whose controls are indicated generally at 11 adjustably controls the operation of the slide injection lever 12 of the slide positioning mechanism 6 to successively present the slide frames 7 from the magazine 5 to the viewing position at a rate set by the viewer on timer control 11. The slide changer 1 will now be described in greater detail under suitable headings.

Slide Frame Positioning

As illustrated in FIGS. 24 and 25, the slide frames 7 are moved to and from the magazine 5 by the operation of the injection lever 12 and the pusher arm 16 on slide lever 13. The end 12a on the injection lever 12 is guided into position on the slide frame 7 by the engagement of the hook 12b on the injection lever 12 with the recess 15 of the slide frame 7. The injection lever 12 then moves the slide frame 7 to the viewing position as illustrated in FIG. 25. A pusher arm 16 mounted on the opposite end of the slide lever 13 is adapted to engage the rear of slide frame 7 to return slide frame 7 to the magazine 5 when the injection lever 12 is withdrawn from the magazine 5.

As seen in FIG. 24, the injection lever 12 is connected to the slide lever 13 by means of the slide lever handle 17. The injection lever 12 is pivotally connected to the handle 17 by the pin 18 which is slidably fitted in the slot 19 in the handle 17. The inner end of the injection lever 12 is slidably fitted in an injection lever guide 20. A cam pin 21 in lever guide 20 engages a cam slot 22 in the injection lever 12 which is suitably shaped as seen in FIG. 21 to lower the hook 12b of the injection lever 12 into the recess 15 of the slide frame on the inward motion of handle 17 when the slide frame 7 is being moved into the viewing position and to lift the hook 15b from the recess 15 when the slide frame 7 is being moved from the viewing position by the pusher arm 16 towards its storage position in the magazine 5 as seen in FIG. 21. The final positioning of the slide frame 7 within the magazine 5 is done by cam surfaces 14 on the magazine guide plate 4 (FIGS. 1 and 24) as the magazine 5 is indexed along the guide plate 4.

The slide lever 13 is slidably mounted on the underside of the top 30 (FIGS. 2 and 28) of the base 2 within slotted channel member 31 which forms a track for the slide lever. An elongated slot 32 in the top plate 30 is provided for the slide lever handle 17 and for the pusher arm 16 mounted on the opposite ends of the slide lever 13 and a slot 33 is provided in channel 31 for the slide lever drive means. In order to provide for the final withdrawal movement for the injection lever 12 from magazine 5 independently of the movement of pusher arm 16, a cam 40 is provided on handle 17 as is illustrated in FIG. 26. As seen in FIG. 26, the cam 40 is pivotally connected between injection lever 12 and the handle 17 by pin 18. The cam 40 is also pivotally attached to the gripping portion of the slide lever handle 17 by pin 41. As the injection lever 12 is withdrawn from the magazine 5, the lower edge 42 of the cam 40 strikes a projection 43 on the slot edge 44a of guide plate 44 (FIG. 31). This moves the upper edge of the cam 40 to the extreme outer edge 19a of the slot 19 (FIG. 21), thereby causing the injection lever 12 to move more rapidly than the slide lever 13 and its interconnected pusher arm 16. During the final portion of the injection lever motion, the cam slot 22 in the injection lever 12 raises the injection lever 12 clear of the recess 15 in the slide frame 7, allowing the injection lever to be drawn outwardly from the slide frame 7 and clear of the magazine 5 by the motion of cam 40.

In the event that the operator improperly fits the magazine 5 into position or where damaged slide frames 7 are inadvertently used in the magazine 5, the mechanism of the slide changer may jam with the slide injection lever 12 in its inserted position within the magazine 5. In this case it is sometimes desirable to move the slide injection lever 12 independently of the slide lever 13 and to withdraw it from the magazine 5 in a disconnected manner as is illustrated in FIG. 32. To facilitate this operation, the injection lever handle 17 is detachably connected to the slide lever 13 by being formed in two separable portions. As seen in FIG. 27, the injection lever handle 17 has a gripping portion 23 which is slidably connected to the injection lever 12 by the pin 18 in slot 19. The gripping portion 23 is detachably connected to the slide lever portion 24 by pins 25 and 26 which engage the slots 27 and 28 in the slide lever 24 of the handle 17. A spring member 29 urges the lower pin 26 downwardly into the lower slot 28 to hold the gripping portion 23 in its connected position. When it is desired to disconnect the slide injection lever 12 from the slide lever 13, the gripping portion 23 of the slide lever handle 17 is raised upwardly against the force of the spring 29, allowing the lower pin 26 to be swung upwardly from slot 28 and thereafter permitting the pin 25 to be lifted clear of the vertical slot 27.

The injection lever guide 20 is preferably formed on the guide plate 44 and the entire guide plate 44 is removably positioned on the top 30 of base 2 so that the injection lever guide 20 may be removed from the base 2 (FIG. 32) when it is desired to release the injection lever 12 from the slide lever 13 and from the injection lever guide 20. As seen in FIG. 1, guide plate 44 has a vertical flange 45 whose opposite ends 45a fit beneath projections 46 on the magazine support plate 47. The outer end of the guide plate 44 is positioned by a suitable pin 48 which fits into slot 49 in the guide plate 44. The injection lever 12, therefore, may be completely removed from the slide projector by removing the gripping portion 23 of the slide lever handle 17 from the slide lever 13 and by thereafter lifting the guide plate 44 clear of the base 2. This permits the clearance of any possible jamming conditions whether the injection lever 12 is inserted into or withdrawn from the magazine 5.

Positioning frame 34, which holds the slide frame 7 in position in the viewing position, is illustrated in FIGS. 23 and 24. The slide frame positioner 34 comprises a framelike face plate 35 which is attached to the magazine guide plate 4 and positioned on the top plate 30 of the base 2 and which has a suitable aperture 36 to frame the transparent slide. Channel members 37 and 38 are attached to the upper and lower portions, respectively, of the slide frame positioner 34 to receive the upper and lower edges of the slide frame 7 after it has been moved into the viewing position by the injection lever 12.

In order to cut off the projection beam during the interval while the slide frames 7 are changed, a shutter means is provided as illustrated in FIGS. 21, 22, and 23. The shutter means comprises a shutter plate 50 which is mounted on generally parallel shutter arms 51 and 52. One end of each of these arms is pivotally attached to the shutter plate 50 and the opposite ends are pivotally attached at spaced pivot points 53 and 54 on the shutter bracket 55. The shutter is moved from its closed position as illustrated in FIGS. 21 and 23 to its open position as illustrated in FIG. 22 by the shutter rod 56. The lower end of the shutter rod 56 is pivotally attached to the upper shutter arm 51 as indicated at 57 and the opposite or upper end of the shutter rod 56 has a hook portion 58 which is positioned in a slot 59 (FIG. 24) in the slide frame positioner 34. Slot 59 is adjacent the outer end of the lower slide frame channel 38 so that hook portion 58 is engaged by the edge of the slide frame 7 when the slide frame 7 is moved into the viewing position, causing the hook 58 to be moved from its inward position as seen in FIGS. 21 and 24 to its outer position as illustrated in FIGS. 22 and 25. This motion of the shutter rod 56 rotates the shutter arms 51 and 52 about their pivot points 53 and 54, respectively, against the force of the spring 61, thereby causing the shutter plate 50 to move clear of the aperture 36 to its lowered position as illustrated in FIG. 22. The shutter 50 is therefore moved away from the aperture 36 when the slide frame is moved nearly completely into the viewing position by the injection lever 12 since the slide frame 7 does not contact the shutter actuating rod 56 until its outer edge reaches the inner edge of the slot 59. As seen in FIGS. 24 and 25, a spring clip 39 is mounted on the bottom of the slide frame positioner 34 in such a position that it releasably engages the pusher arm 16 when the pusher arm 16 has been moved to the viewing position to hold the slide frame 7 in a steady viewing position against the force of shutter spring 61.

Changer Drive Means

Figure 2:
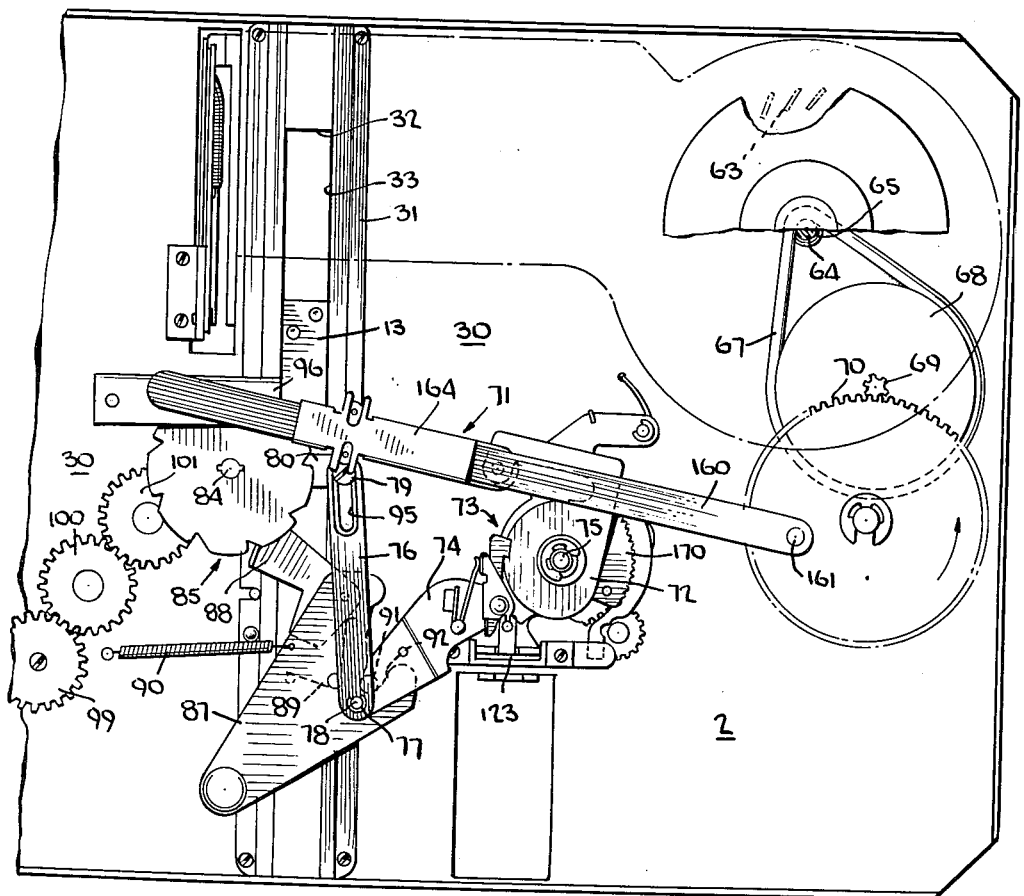
FIG. 2 is a bottom plan view of the slide changer base.

A typical slide projector uses a motor driven blower 63, as is illustrated in dash-dot lines in FIG. 2. The drive power for the changing mechanism, including the slide injection lever 12 and the slide lever 13, is preferably taken from the blower motor shaft 64, for example, by a suitable pulley 65 through the intermediation of drive belt 67, pulley 68, gears 69 and 70, connector rod 71, operating disk 72, and engagement lever 74. The operating disk 72 is rotatably mounted on a cam shaft 75 and it is rocked or oscillated thereon by the connector rod 71 as the gear 70 is rotated from the rotating blower shaft 64. The operating disk 72 is removably connected to the engagement lever 74 by an engaging means indicated generally at 73, which will be described in greater detail below. The rocking motion of the operating disk 72 is transferred by the engagement lever 74 and the slide link 76 to a reciprocal motion of the slide lever 13. The slide link 76 is pivotally connected at one end 77 by a pivot 78 to the engagement lever 74 and is pivotally connected at its opposite end by a pivot 79 and a bracket 80 to the slide lever 13. As long as the operating disk 72 and the engagement lever 74 remain connected by the engaging means 73, each rotation of the gear 70 will cause a single passage of the injection lever 12 into and out of the magazine 5 to move one slide frame 7 to and from the slide viewing position.

In order to control the length of time during which each slide holder 7 is in the viewing position, the engaging means 73 disconnects the continually rocking operating disk 72 from the engagement lever 74 for adjustable periods of time after the injection lever 12 has moved a slide holder 7 into the viewing position. The operation of the engaging means 73 to provide for the disconnection is controlled by an operating lock 123 under the optional control of an automatic timer or a manually operated control means, as will be more fully described below.

Magazine Indexing Means

The magazine indexing means operates each time that a slide frame 7 is returned to the magazine 5 to move the magazine along the support plate 47 to present the next slide frame 7 to the injection lever 12.

Each of the magazines 5 has an elongated rack 82 on its bottom side which is adapted to be engaged by a pinion gear 83 rotatably mounted on shaft 84 upon the magazine support plate 47 so that the teeth of the gear 83 mesh with the rack 82 when the magazine 5 is moved into position against the magazine rail guide plate 4 and the magazine support plate 47. For each cycle of the injection lever 12 moving a slide into and out of the viewing position, the gear 83 control means indicated generally at 85 (FIGS. 2 and 3) turns the gear 83 to advance the magazine 5 a distance corresponding to the width of one slide compartment. Each time that the injection lever 12 reaches its fully withdrawn extended position outside of the magazine 5, the magazine 5 is moved forward to present the next slide holder 7 to the injection lever 12.

Figure 3:
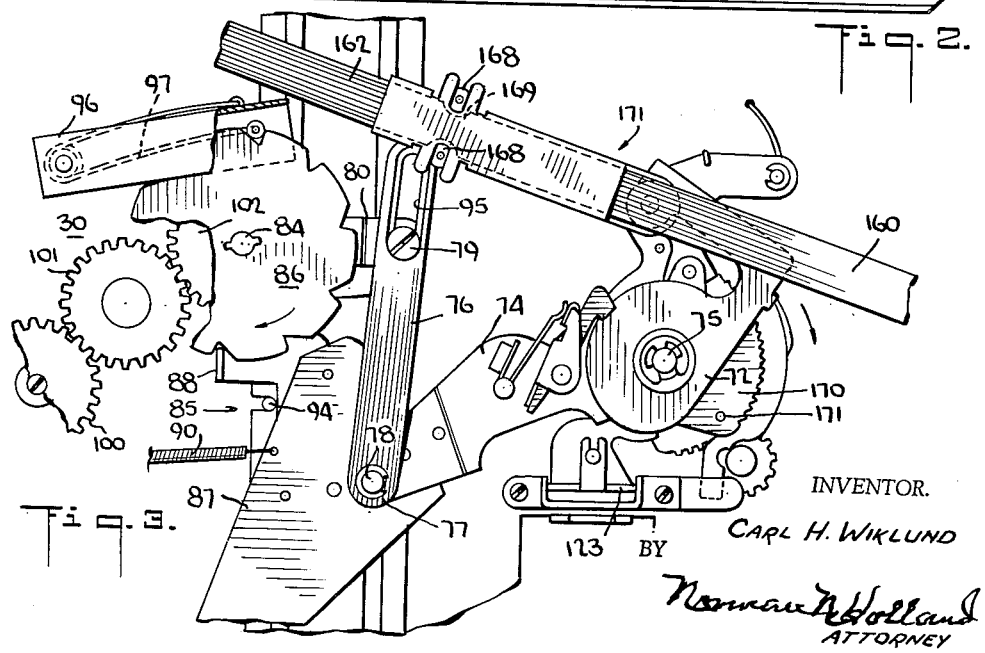
FIGS. 3 and 4 are bottom plan views corresponding generally to FIG. 2 showing the slide changing means in different portions of its cycle.
Figure 4:
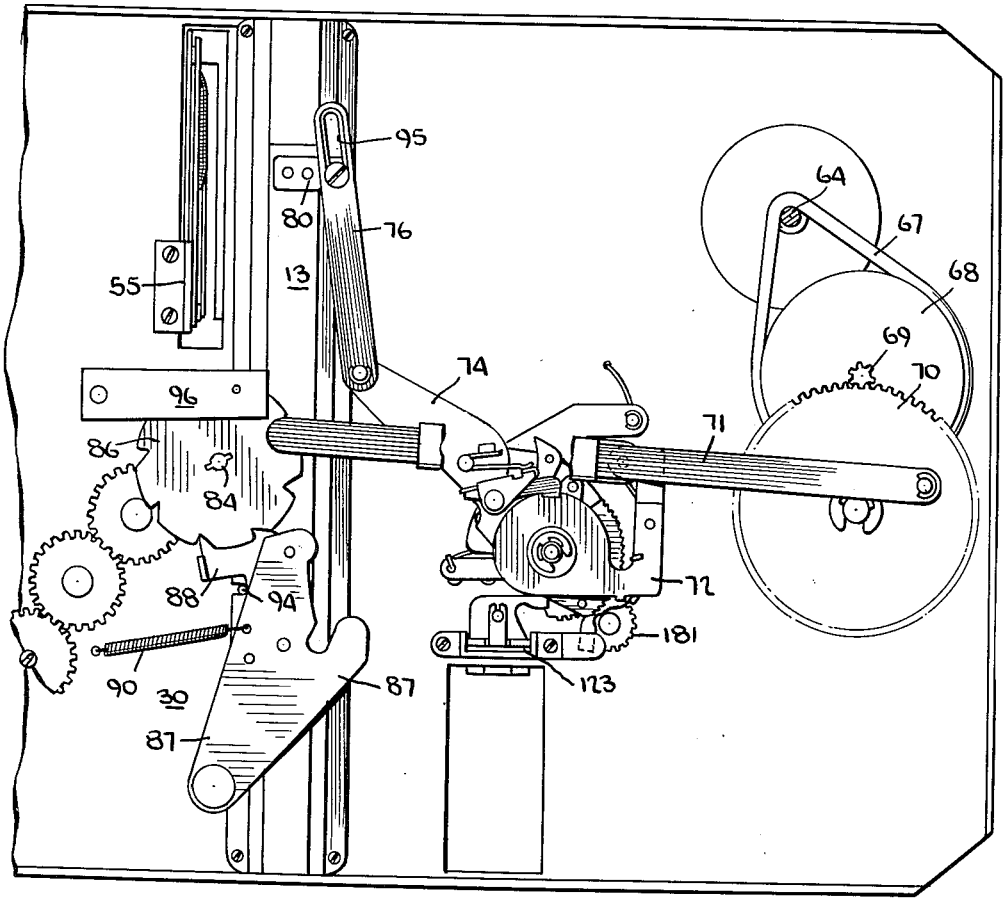

This action of the gear control means 85 is illustrated in FIGS. 2, 3, and 4. Ratchet 86 is pivotally mounted on the opposite end of the gear shaft 84 beneath the base top 30. A pawl lever 87 is pivotally attached to the top 30 adjacent to the ratchet 86 having a pawl 88 pivotally connected thereon. The pawl 88 is resiliently urged against the ratchet 86 by the spring 89 on the pawl lever 87 and the pawl lever 87 urges the pawl 88 to rotate the ratchet 86 in a clockwise direction (FIG. 3) under the force of a spring 90 which is connected between the base top 30 and the pawl lever 87. When the slide lever 13 is moved to its outer position with the injection lever 12 withdrawn from the magazines as illustrated in FIGS. 2 and 21, the contact pin 91 on the engagement lever 74 contacts the slot 92 in pawl lever 87 and rotates it to its indexing start position with spring 90 stretched as seen in FIG. 2. Thereafter, continuing movement of the engagement lever 74 in a clockwise direction causes the pin 91 to release the pawl lever 87 so that it is rotated in a counterclockwise direction by spring 90 and so that the pawl 88 rotates the ratchet 86. The gear 83 is thereby turned to advance the magazine to present the next slide frame 7 to injection lever 12. The rotation of the pawl lever 87 is checked at the desired point by a stop 94. In order to allow the magazine 5 to be stepped to its next position by the movement of the engagement lever 74 before the injection lever 12 enters the magazine 5 where it would interfere with the stepping action, the pivot 79 which connects the slide link 76 to the slide lever 13 is slidably fitted in a slot 95 in the slide link 76. As seen in FIGS. 2 and 3, the initial movement of the engagement lever 74 at the start of a cycle rotates the ratchet 86 to step the magazine without moving the slide lever 13 to move the injection lever 12 within the magazine. Thus, the motion of the ratchet 86 occurs while the pivot 79 moves from one end of the slot 95 to the other as seen in FIGS. 2 and 3.

A pivotally mounted locking pawl 96 is resiliently urged against the teeth of ratchet 86 by the spring 97 to hold the magazine in position at the termination of the magazine stepping action. The magazine 5 may be manually positioned by the stepping handle 98 which is connected to the ratchet 86 by gears 99–102.

The Engagement Means

As described above, the operating disk 72 is continuously rocked or oscillated on the cam shaft 75 by the blower motor shaft 64. The engagement means 73 provides a detachable connection between the oscillating operating disk 72 and the engagement lever 74 which reciprocates the slide frame injection lever 12 through the intermediation of the slide link 76 and the slide lever 13.

The engagement means 73, illustrated in FIGS. 13 and 14, comprises an engagement hook 110 pivotally attached at 113 to the engagement lever 74 and positioned to engage a hook engaging means or slot 111 on the operating disk 72 under the control of an engagement cam follower 112 which is pivotally mounted on engagement lever 74 on the same pivot 113 as engagement hook 110. The engagement cam follower 112 is controlled by a downwardly extending contact 114 which rides on a cam surface 115 on engagement cam 116. The engagement cam 116 is mounted by means of a slot 117 on the cam shaft 75, and it is adapted to be rotated between two positions on the cam shaft 75 by an engagement cam release 118 which is also mounted on cam shaft 75. In the first or engaged position of engagement cam 116, as seen in FIG. 13, the cam surface 115 and contacting foot 114 have been moved inwardly toward cam shaft 75 by spring 119 so that engagement hook 110 engages slot 111 in operating disk 72. In its second or disengaged position, as seen in FIG. 14, the cam surface 115 is moved outwardly from cam shaft 75 so that the engagement cam follower 112 is swung outwardly, allowing spring 120 to move engagement hook 110 from slot 111.

When the engagement cam 116 is in its engaged position, as seen in FIG. 13, with the engagement hook 110 seated in slot 111, the operating disk 72 and the engagement lever 74 move in synchronism and the slide transfer means moves through a slide changing cycle, thereby moving one slide frame 7 out of the viewing position and another one into the viewing position for each rotation of the gear 70. When the engagement cam 116 is in its disengaged position, as seen in FIG. 14, the slide transfer means remains stationary with a slide frame 7 in the viewing position.

The engagement cam 116 is moved between its engaged and its disengaged positions by the engagement cam release 118, which is controlled by means of an automatic timing means indicated generally at 122, or at the option of the operator by manually operated operating lock 123.

The engagement cam release 118 is rotatably mounted on the cam shaft 75 immediately adjacent to the engagement cam 116 with a cam roller 125 on the engagement cam release 118 engaging a cam slot 126 in the engagement cam 116. The rotatable members on cam shaft 75 with the exception of the engagement cam 116 and the engagement cam release 118 are separated from one another by neutralizing washers 75a. With the hooked end portion 127 of the engagement cam 116 preventing rotational movement of the engagement cam 116 about cam shaft 75 by its engaging contact 114, the counterclockwise rotation of the arm 128 of engagement cam release 118 from the engaged position as seen in FIG. 13 to the disengaged position as seen in FIG. 14 moves roller 125 from the radially outward end 129 of slot 126 to the radially inward end 130, causing the engagement cam 116 to move in slot 117 on cam shaft 75 so that cam surface 115 of the engagement cam 116 moves outwardly from cam shaft 75, thereby lifting the engagement cam follower 112 and removing the engagement hook 110 from slot 111.

Figure 5:
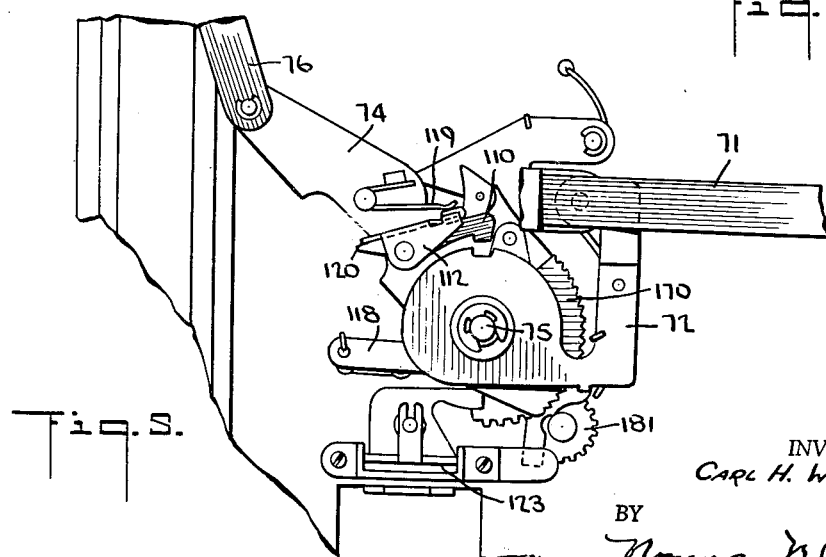

The engagement cam release 118 is urged towards its engaged position, as seen in FIGS. 4 and 13, by a spring 132 connected to the outer end of arm 128 on the engagement cam release 118. When the engagement cam release 118 is in this position, the engagement hook engages slot 111, causing the engagement lever 74 to rotate with the operating disk 72. As the engagement lever 74 moves in a counterclockwise direction, as seen in FIG. 3, the contact or arm 114 on the engagement cam follower 112 strikes the arm 128 of the engagement cam release 118 and moves the engagement cam release 118 to its disengaged position, as seen in FIG. 14. When the engagement cam release 118 reaches this position, the release lock 123 engages the extension 133 on the engagement cam release 118 and holds it in its disengaged position. As the engagement lever 74 continues on its cycle and is carried in a clockwise direction by the operating disk 72 back to the starting position, as seen in FIG. 4, the engagement cam 116 lifts the engagement cam follower 112 releasing the engagement hook 110 from the slot 111 as seen in FIG. 5. The operating disk 72 will now oscillate independently of the engagement lever 74 so that the slide frame 7 which has been moved into the viewing position by the clockwise motion of the engagement lever 74 will remain in the viewing position until the release lock 123 is operated, as will be explained below, to free the engagement cam release 118 to initiate another cycle.

The release lock 123 has an L shaped cross section (FIGS. 14 and 15) and it is pivotally mounted at the end of one of its legs 139 by pinions 140 which are swingably mounted in release lock bracket 141. A release lock button 142 controls the position of the release lock 123 through the intermediation of release lock shaft 144. The end 150 of release lock shaft 144 engages arm 145 on the release lock 123 and passes through suitable apertures 146 and 147 in the release lock 123 and the base 2, respectively. The release lock shaft 144 mounts release lock button 142 on its upper end 148 and has compressed spring 149 positioned between base 2 and the release lock button 142 which urges the attached end 150 of the release lock shaft 144 towards the base 2, causing the leg 151 of the release lock 123 to be resiliently urged towards the base 2. When the engagement cam release 118 is rotated to its disengaged position as shown in FIG. 14, the spring 149 causes the leg 151 of the release lock 123 to swing inwardly and to engage the extension 133 of the engagement cam release 118, thereby locking it in its disengaged position. When the release lock button 142 is pressed towards the base 2, release lock 123 pivots away from the undersurface of the base 2, thereby moving the leg 151 clear of the engagement cam release 118 so that it snaps to its engaged position under the force of the spring 132. A cam surface 154 is provided on the leg 151 of the release lock 123 which is adapted to be engaged by the timing mechanism. As will be more fully explained below, the timing mechanism engages surface 154 to rotate the release lock 123 clear of the engagement cam release 118 in the same manner as the release lock button 142.

The release lock 123 may be operated from a remote position by a suitable flexible cable or by an electrical relay or an air cylinder connected by wires or tubes.

*Timer Mechanism*

The timer mechanism 122 is provided on the cam shaft 75 to automatically operate the release lock 123 at predeterminable and adjustable intervals so that the slide actuating mechanism will move successive slide frames 7 to the viewing position automatically at predetermined intervals. The timer mechanism (FIGS. 14–16) comprises a ratchet disk 170 rotatably mounted on the cam shaft 75 concentrically with operating disk 72. The ratchet disk 170 has a cam pin 171 mounted adjacent its outer edge which is adapted to engage the cam surface 154 of the release lock 123 when the ratchet disk 170 is rotated clockwise by a pawl 176 on operating disk 72 from its starting position as seen in FIG. 15 to the position shown in FIGS. 16 and 17. As is best seen in FIG. 16, the cam pin 171 in this position engages the cam surface 154 of the release lock 123, thereby rocking the leg 151 of the release lock 123 outwardly from the base 2 so that the engagement cam release 118 springs to its engaged position. When the engagement cam release 118 is moved to its engaged position, engagement lever 74 is conected to operating disk 72 so that it rotates in synchronism with the operating disk 72 first counterclockwise and then clockwise. During the counterclockwise portion (FIGS. 17 and 18) of the rotation of the engagement lever 74, the engagement cam follower arm 114 contacts the end 175 of the ratchet disk 170 and rotates it in a counterclockwise direction. This moves the cam pin 171 clear of the release lock 123 and returns the ratchet disk 170 to its starting position as seen in FIG. 18. The release lock 123 re-engages the engagement cam release 118 so that when the engagement lever 74 returns to slide viewing position as seen in FIG. 7, the engagement hook 110 will be released from slot 111 as described above, disconnecting the engagement lever 74 from the operating disk 72. As the gear 70 continues to rotate, the operating disk 72 continues to oscillate or rock about the cam shaft 39. This rocking motion of the operating disk 72 is transferred to the ratchet disk 170 by an operating pawl 176 which is pivotally mounted at the edge of the operating disk 72, as seen in FIGS. 12 and 15.

In order to adjustably determine the portion of the oscillation of the operating disk 72 during which the operating pawl 176 engages the teeth of the ratchet disk 170 therefore the number of oscillations required to move the cam pin 171 against lock 123, a timing cam 177 is provided in the path of the operating pawl 176. As seen in FIG. 30, the cam 177 is rotatably mounted on cam shaft 75 and it has a generally arcuate cam surface 178 which is engaged by a cam follower 179 on the pawl 176. While the cam follower 179 is in engagement with the cam surface 178, the pawl 176 is lifted out of engagement with ratchet disk 170. By rotating the cam 177 on cam shaft 75, the portion of the cam surface 178 which engages the cam follower 179 on ratchet 176 may be varied and thus the portion of the oscillation of operating disk 75 during which the ratchet 176 engages ratchet disk 170. The position of the cam 177 is controlled by the cooperating rack portion 180 on cam 177 and pinion gear 181. Pinion gear 181 is mounted on rotatable shaft 182 which has a control knob 183 mounted thereon (FIG. 19) above base 2. When the cam 177 is rotated to its extreme clockwise (FIG. 30) position, the pawl 176 is held out of engagement with the ratchet disk thereby preventing automatic cycling, control knob 183 will indicate "M" or "Manual" on the calibrated plate. At this setting the timing mechanism is inoperative and slides may be viewed for longer intervals. To view successive slides, release lock button 142 is depressed thereby instituting one complete cycle and presenting the next slide frame 7. When the cam 177 is rotated so that control knob 183 is set at the highest interval for automatic operation, the pawl 176 contacts the ratchet disk for only a small portion of its oscillating motion about cam shaft 75, thereby requiring a relatively large number of oscillations to move the cam pin 171 against lock 123 to initiate a slide changing action. When the cam is moved to its extreme counterclockwise position, the pawl 176 is in contact with the ratchet disk over a major portion of its travel, thereby moving the cam pin 171 against lock 123 in a relatively few oscillations and a correspondingly short time. The cam 177 may be set at any position between its extreme positions by control knob 183 to provide the slide viewing interval desired. A suitably calibrated plate is provided adjacent knob 183 to provide an indication of the intervals.

A neutralizing cam 184 is pivotally mounted at 185 on base 2 adjacent to timing cam 177 (FIG. 30). Neutralizing cam 184 has an arcuate cam surface 186 which engages the cam follower 179 of the timer pawl 176 when the neutralizing cam is in its operative position as seen in dash-dot lines in FIG. 30. In this position, the pawl 176 is held out of engagement with the ratchet disk 170 so that the automatic slide changing action is inoperative. When the neutralizing cam is in its inoperative position as seen in FIG. 30, its cam surface 186 is spaced from the pawl 176 and it has no effect thereon.

The position of the neutralizing cam is controlled by a hold button 187 mounted in the hollow center of the timer control knob 183 (FIG. 19). Hold button 187 has a downwardly extending rod 188 slidably mounted in the hollow center of control knob shaft 182. The rod 188 has a flange 189 on its lower end which engages the end 210 of the neutralizing cam 184 and holds it in its inoperative position as seen in FIG. 30. When the hold button 187 is pushed downwardly against its biasing spring 211 (FIG. 19), the flange 189 on rod 188 moves beyond the neutralizing cam, allowing the neutralizing cam to move against the rod 188 under the force of spring 214 with slot 212 engaging the rod 188. In this position, the neutralizing cam moves to its operative position engaging the cam 179 of pawl 176 and holding the pawl 176 away from the ratchet disk 170 so that the slide changing operation is suspended.

In order to resume the automatic changing cycle, the release lock button 142 is pressed, thereby starting a new cycle as described above. During the cycle, the arm 114 of the engagement cam follower 112 swings the engagement cam release 118 and the associated engagement cam 116 to their extreme counterclockwise position as seen in FIG. 18. At this point cam roller 215 on the engagement cam 116 rotates the neutralizing cam in a clockwise direction about its pivot 185, thereby moving its end 210 free of the control knob rod 188 so that the control knob returns to its normal position as seen in FIG. 30 with the neutralizing cam in its inoperative position.

Slide magazines 5 may be loaded on to the magazine guide plate 4 while the slide injection lever 12 is either in its withdrawn or viewing positions with respect to the magazine 5. When the slide injection lever 12 is withdrawn, the magazine 5 is positioned with the first slide frame 7 adjacent the slide injection lever 12 so that the next changing cycle moves the first slide frame 7 into the viewing position. When the slide injection lever 12 is in its viewing position, the end 5a of the magazine 5 is moved against the side of the injection lever 12. In this position, the first tooth on the magazine rack 82 will be engaged by the stepping gear 83. When the changing cycle is started the injection lever 12 will strike the end 5a of the magazine 5 on the first cycle. In order to allow the injection lever 12 to strike the end 5a of the magazine casing 5 without damaging the mechanism and without interrupting the slide changing cycle, an automatically disengageable clutch means is provided in the connector rod 71. This clutch means is illustrated in FIGS. 2 and 3. The connector rod 71 comprises an elongated clutch slide 160 which is pivotally connected at 161 to the gear 70 and which has its other end 162 slidably mounted in a clutch sleeve 164 comprising clutch base 165 and a clutch cover 166. In order to prevent relative motion between the clutch slide 160 and the clutch sleeve 164 during normal operation of the mechanism, generally U-shaped clutch spring 167 is attached to the clutch spring base 165 having a pair of rollers 168 rotatably mounted on its free ends. Cooperating notches 169 are formed in the clutch slide 160 which receive the rollers 168 so that the tension of the spring 167 holds the clutch sleeve 164 and the clutch slide 160 in a fixed relationship for normal operating forces. When the slide injection lever 12 strikes the front end 5a or rear end 5b of a slide magazine 5 or should any of the mechanism connected to the clutch sleeve become otherwise jammed, continued rotation of the gear 70 forces the clutch slide 160 against the rollers 168 with sufficient force to cause them to spread outwardly away from each other and to roll out of the notches 169 in the clutch slide 160, thereby allowing the clutch slide 160 to slide freely in the clutch sleeve 164 as the rollers 168 roll along opposite edges of the clutch slide 160. When the slide injection lever 12 is released for normal movement into the magazine 5, such as on its second cycle after the magazine loading, the rollers 168 automatically drop back into notches 169.

*Operation*

The operation of the slide changing mechanism which has been described in detail above will now be summarized by a description of a slide changing cycle of the mechanism.

When a magazine 5 containing the slide frames 7 is mounted on the magazine guide plate 4, the rack 82 on the bottom of the magazine 5 engages the magazine indexing gear 83. As described more fully above, the rack 82 of the magazine 5 may be engaged with gear 83 with the slide injection lever 12 in either its inserted or withdrawn positions with respect to the viewing position.

The slide changing action may then be initiated by starting the blower motor. The fully automatic features of the invention will then be in effect and the operator needs only to choose the desired slide interval setting. If any time during the automatic operation the operator wishes either to return to a preceding slide or advance to a later slide in the magazine, the hold button 187 is depressed thereby stopping automatic cycling as described above. The operator may then reposition the magazine 5 forward or backward as desired by turning the indexing knob 98 before returning the invention to automatic operation. The injection lever 12 may be moved to this outward position from any portion of the slide transferring cycle as the withdrawal of the injection lever 12 will either rotate the mechanism to the proper position or it will disengage the clutch means in the connecting rod 71 to facilitate its withdrawal should any resistance be provided due to the particular position of the gear 70 in the cycle.

Once the magazine 5 has been placed in position and the slide changing action initiated by the starting of the motor, the operating disk 72 will now be oscillated or rocked on the cam shaft 75 by the motor through the connecting means which includes the connecting rod 71. The timer control knob 183 is adjusted so that the operating pawl 176 engages a predetermined number of teeth on the ratchet disk 170 for each oscillation of the operating disk 72. A given number of oscillations of the operating disk 72 moves the cam pin 171 on the ratchet disk 170 against the lock 123 (FIGS. 5-9). Lock 123 is lifted clear of the engagement cam release 118 so that it shifts the engagement cam to its engaged position as seen in FIGS. 10 and 11. As described more fully above, the hook means 110 now connects the engagement lever 74 with the oscillating operating disk 72 so that the injection lever 12, which is operatively connected to the engagement lever 74, is moved into the magazine 5 so that a slide frame 7 is moved to the viewing position. When the engagement lever 74 reaches this position (FIG. 4), its associated contact 114 has rotated the engagement cam release 118 and the engagement cam 116 to their disengaged position as seen in FIG. 14. Ratchet disk 170 is also returned to its starting position as seen in FIG. 4. At this point, the hook 110 is disengaged (FIG. 5) from the operating disk 32 so that the engagement lever 74 is now disconnected and remains stationary on cam shaft 75 with a slide frame 7 in the viewing position and lock 123, which has re-engaged the engagement cam release 118, will now hold the engagement cam release 118 stationary until the cam pin 171 of the ratchet disk 170 is again moved against lock 123 by a predetermined number of oscillations of the operating disk 72 on the cam shaft 75. When the predetermined number of oscillations of operating disk 72 has occurred, the engagement cam release 118 will again be released from the lock 123 and the engagement lever 74 will be moved through one cycle, causing the injection lever 12 to be withdrawn from the magazine 5, the pusher arm 16 to move toward the magazine 5 the magazine 5 to be advanced by the magazine indexing mechanism whose operation has been fully described above, and the injection lever 12 to be reinserted in the magazine to move the next successive slide frame 7 into the viewing position.

As each slide frame is moved into the viewing position in the slide frame positioner 34, the edge of the slide frame 7 engages the hook 58 on the shutter rod 56. This causes the shutter rod 56 to pull the shutter plate 50 clear of the slide frame positioner aperture 36 as the slide frame 7 is moved into its final viewing position. Since the hook 58 is not engaged by the slide frame 7 until the slide frame 7 is nearly in viewing position, the image will not be projected until the slide frame 7 is in its viewing position.

As more fully described above, release lock button 142 may be pressed to release the lock 123 when it is desired to initiate a slide changing cycle without waiting for the action of the timer. Thus, when the release lock button 142 is held down continuously, a slide will be changed for each oscillation of the operating disk 72. When it is desired to extend the viewing time beyond the interval provided by the timing mechanism, the hold button 137 is pressed so that the neutralizing cam 184 removes the pawl 176 from the ratchet disk 170 so that the slide changing mechanism is temporarily disconnected until the release lock button 142 is again pressed to restore the slide changing mechanism to its normal operation.

Whenever it is desired to view successive slides for a longer interval than is provided for in the automatic timing mechanism, control knob 183 may be set on "M" or "Manual" thereby making automatic features inoperative. Slides may then be viewed for as long as desired and slides may be changed by depressing release lock button 142.

When the last slide frame 7 in each magazine has been returned to the magazine from the viewing position, two more cycles of the slide changer will eject the magazine from the slide positioning means 6. Successive magazines 5 may be loaded into the changer without stopping the slide changing mechanism as the indexing gear 83 will engage the rack 82 of succeeding magazines if their forward end 5a is held against the rear end 5b of the preceding magazine by the operator. The clutch means on the connecting rod 71 prevents jamming as the ends 5a or 5b of the magazines 5 pass the slide injection lever 12.

Should it become necessary to remove the magazine from the magazine guide plate due to a jamming caused by damaged or improperly inserted slide frames 7 while the slide injection lever 12 is inserted into the magazine 5, the slide injection lever 12 may first be removed by disconnecting the gripping portion 23 from the slide lever portion 24 of handle 17 and by thereafter simultaneously lifting the slide injection lever 12 and the guide plate 44 clear of the magazine 5 and the base 2.

It will be seen that the present invention provides a compact and automatic slide changing mechanism adapted to provide for automatic, semiautomatic, or manually controlled slide changing at the option of the operator. An automatic slide changing mechanism is provided in which the viewing interval for a plurality of magazine stored slides may be adjusted within a wide range. The slide viewing interval may be also lengthened indefinitely or shortened as desired by the operator through the operation of convenient controls. The slide changing mechanism is adapted for a compact construction and is thus readily applicable for incorporation into substantially totally-enclosed slide projectors.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A slide changing device comprising the combination of a base, a slide frame positioner located on said base, a slide changing means, a magazine guide means on said base adapted to slidably support a slide magazine intermediate said slide frame positioner and said slide changing means, and said slide changing means comprising a slide lever reciprocably mounted on said base and having a slide injection lever at one end adapted to removably engage slide frames in a magazine supported by said guide means to move them to the slide frame positioner, a pusher arm on the opposite end of said slide lever adapted to engage slide frames in said slide frame positioner to return them to the magazine, and said slide injection lever pivotally connected to said slide lever by a cam, and a cooperating projection on said guide means whereby the slide injection lever is moved relative to the slide lever and the pusher arm by the movement of said cam by said projection to fully withdraw the slide injection lever from the magazine.

2. The device as claimed in claim 1 in which said slide injection lever is removably connected to said slide lever whereby said slide injection lever may be withdrawn from the magazine independently of the slide lever when the slide lever has been jammed by operative errors.

3. The device as claimed in claim 1 in which said slide injection lever is slidably mounted on said slide lever for longitudinal motion between fixed limits, said cam being pivotally connected at spaced points to said slide lever and said slide injection lever respectively, and said cooperating projection positioned adjacent the path of said slide injection lever to control the movement of said cam on said pivots and to thereby position the slide injection lever with respect to the slide lever.

References Cited in the file of this patent

UNITED STATES PATENTS

| | | |
|---|---|---|
| 773,786 | Colordeau et al. | Nov. 1, 1904 |
| 1,161,660 | Guerzoni et al. | Nov. 23, 1915 |
| 2,503,239 | Antos | Apr. 11, 1950 |
| 2,590,492 | Bennett et al. | Mar. 25, 1952 |
| 2,671,378 | Burla | Mar. 9, 1954 |
| 2,677,986 | Burla | May 11, 1954 |
| 2,705,438 | Peto | Apr. 5, 1955 |
| 2,711,602 | Wiklund | June 28, 1955 |
| 2,756,630 | Goldberg | July 31, 1956 |
| 2,874,497 | Huff et al. | Feb. 24, 1959 |